United States Patent
Patterson et al.

(10) Patent No.: US 8,713,592 B2
(45) Date of Patent: Apr. 29, 2014

(54) SELF-SERVICE CHANNEL MARKETPLACE

(75) Inventors: Jim Patterson, San Francisco, CA (US); Hunter Walk, San Francisco, CA (US); Kuan Yong, San Francisco, CA (US)

(73) Assignee: Google Inc., Mountain View, CA (US)

( * ) Notice: Subject to any disclaimer, the term of this patent is extended or adjusted under 35 U.S.C. 154(b) by 164 days.

(21) Appl. No.: 12/826,530

(22) Filed: Jun. 29, 2010

(65) Prior Publication Data

US 2011/0321072 A1 Dec. 29, 2011

(51) Int. Cl.
*H04N 5/445* (2011.01)
*G06F 3/00* (2006.01)
*G06F 13/00* (2006.01)

(52) U.S. Cl.
USPC .......... 725/14; 725/10; 725/13; 725/46

(58) Field of Classification Search
None
See application file for complete search history.

(56) References Cited

U.S. PATENT DOCUMENTS

| | | | |
|---|---|---|---|
| 6,078,866 A * | 6/2000 | Buck et al. ................. 702/2 |
| 2002/0170053 A1* | 11/2002 | Peterka et al. .............. 725/31 |
| 2003/0233656 A1 | 12/2003 | Sie et al. |
| 2005/0283792 A1* | 12/2005 | Swix et al. ................. 725/9 |
| 2009/0276311 A1* | 11/2009 | Pujet et al. ............. 705/14.52 |
| 2009/0288118 A1 | 11/2009 | Chang |
| 2010/0082650 A1* | 4/2010 | Wong ..................... 707/758 |
| 2010/0228595 A1* | 9/2010 | Dempster et al. .......... 705/10 |
| 2010/0293057 A1* | 11/2010 | Haveliwala et al. ...... 705/14.66 |
| 2010/0324993 A1* | 12/2010 | Kacholia et al. .......... 705/14.54 |
| 2011/0137818 A1* | 6/2011 | Goad et al. ............... 705/347 |
| 2011/0214147 A1* | 9/2011 | Kashyap et al. ............. 725/46 |
| 2012/0066716 A1* | 3/2012 | Wang et al. ................ 725/38 |

FOREIGN PATENT DOCUMENTS

KR 10-2007-0037545 A 4/2007
WO WO 2011/119775 A1 9/2011

OTHER PUBLICATIONS

PCT International Search Report and Written Opinion, PCT/US2011/034334, Dec. 20, 2011, 7 Pages.
Youtube, Inc., "Most Subscribed Channels (All Time)," Archived on Web.archive.org on Sep. 3, 2006, 1 Page [online] [retrieved on May 7, 2013] Retrieved from the internet <URL:http://web.archive.org/web/20060903035149/http://www.youtube.com/members?s=ms&t=a&g=0>.

* cited by examiner

*Primary Examiner* — Ricky Chin
(74) *Attorney, Agent, or Firm* — Fenwick & West LLP

(57) ABSTRACT

A content hosting system allows content providers to create channels of video content and make them available to users in a marketplace. Users can search or browse for channels of interest, and selectively subscribe to channels. Users can also pay for the right to view premium videos in each channel. The system ranks channels according to the value provided. Generally, users will seek out and subscribe to the highest ranked channels that provide the greatest value. The ranking function allows different providers to compete for the subscriptions of users. Providers can observe their channel's reception in the market by analyzing rankings and usage statistics to adjust channels to maximize channel performance. The system operator can also create bundled channels containing videos from multiple providers, and the resulting subscription revenue can be distributed to the various providers of the videos in the channel.

20 Claims, 10 Drawing Sheets

FIG. 5

YouTube — Broadcast Yourself
Worldwide | English

Home | Videos | Movies | Shows username12 ▼ | Account | QuickList (3) | Help | Sign Out Search Shows ▶

Upload ▷

Categories
Shows
Movies

Channels
Autos & Vehicles
Comedy
Education
Entertainment
Film & Animation
Gaming  540
Howto & Style
Music
News & Politics
Nonprofits & Activism
People & Blogs
Pets & Animals
Science & Technology
Sports
Travel & Events
Contests
Events

500

Spotlight      550

◁ 1 2 3 4 ⌃

DISCOVERY CHANNEL

530

Discovery Channel
Education, Science & Technology
Explore the best science and nature programming for the whole family. Featuring shows like Mythbusters, Man vs Wild, Deadliest Catch, Planet Earth, and Shark Week!

Subscribe $3.99/month
More Information

Most Subscribed | Paid | Free | Made 4 Web | Premium 1-8 of 377                                                 Next> Last>>

520

SMOOSH — Smosh Premium ☐ | Sketch Comedy | $0.99/month
Phasellus ultricies neque ut risus. Maecenas gravida venenatis mi. Suspendisse at dolor ultrices sem ultrices.

ANIMAL PLANET — Animal Planet ☐ | Educational | $1.99/month
Phasellus ultricies neque ut risus. Maecenas gravida venenatis mi. Suspendisse at dolor ultrices sem ultrices.

HBO — HBO ☐ | Movies & Original Series | $3.99/month
Phasellus ultricies neque ut risus. Maecenas gravida venenatis mi. Suspendisse at dolor ultrices sem ultrices.

SHOWTIME — Showtime ☐ | Movies & Original Series | $3.99/month
Phasellus ultricies neque ut risus. Maecenas gravida venenatis mi. Suspendisse at dolor ultrices sem ultrices.

LisaNova Premium ☐ | Sketch Comedy | $1.99/month
Phasellus ultricies neque ut risus. Maecenas gravida venenatis mi. Suspendisse at dolor ultrices sem ultrices.

TLC — TLC ☐ | Drama
Phasellus ultricies neque ut risus. Maecenas gravida venenatis mi. Suspendisse at dolor ultrices sem ultrices.

Premium Subscriptions Transaction History

710 —

| | Uploaded Videos |
|---|---|
| | Favorites |
| | Playlists |
| | Subscriptions |
| | Quicklist |
| | History |
| | Purchases |
| | Premium Subscriptions |
| | Purchases Videos |

711  712  713
[All] [Active Only] [Expired Only]

| | Channel | Subscription Start | Subscription End | Status | Price | Renewal 750 | Action |
|---|---|---|---|---|---|---|---|
| 1. | collegehumor | Aug 1, '09 | Aug 31, '09 | Active | $1.99/mo. | Auto ▽ | Subscription will renew automatically on Sept 1, 2009 |
| 2. | Discovery | Aug 5, '09 | Sept 4, '09 | Active | $3.99/mo. | Manual ▽ | Renew for the period Sept 5-Oct 4, '09 |
| 3. | A&E Mindfreak | Aug 5, '09 | Sept 4, '09 | Active | $3.99/mo. | Manual ▽ | Subscription will renew on Sept 5, '09 Don't renew |
| 4. | Fred | Jul 1, '09 | Jul 31, '09 | Expired | $1.99/mo. | | Add channel to shopping cart |
| 5. | nigahiga | Jul 1, '09 | Jul 31, '09 | Expired | $1.99/mo. | | Added to shopping cart |

730  720  740

To cancel a premium subscription, simply change your renewal preference for the channel to "Manual". The subscription will expire automatically after the subscription end date. You will continue to be able to access the premium channel until the subscription end date. Learn more

FIG. 7

SELF-SERVICE CHANNEL MARKETPLACE

BACKGROUND

1. Field of Art

The invention generally relates to the field of online video delivery and, more particularly, relates to bundling and ranking of online videos.

2. Description of the Related Art

Online content hosting services such as YouTube, Netflix, Amazon, and Hulu provide online video viewing experiences. Some of these services provide unlimited free viewing of both user generated content and premium content provided by traditional content providers such as movie studios and broadcast networks. Some of these services enable users to pay for premium content at a fixed price that allows for unlimited consumption of all available premium content on a monthly basis, for example satellite and cable television packages. Others provide pricing for a la carte purchase of individual content items, for example video on demand.

None of the above schemes provide a direct, effective mechanism for users to affect pricing and availability of certain content.

SUMMARY

A content hosting system enables content providers to create various channels of video content, where video content is delivered online from the content hosting system to subscribers at their respective client devices. For a particular channel the content provider selects which videos will be included in the channel, their availability in the channel, and the pricing terms for a premium subscription to the channel. Generally a channel will contain premium content that is not otherwise freely available in the content hosting system. The selection of videos available for a subscriber to watch in a channel can change over time, so as to provide subscribers with an incentive to continue their subscriptions. The content provider can define a channel to allow subscribers to view the available videos in any order at any time, or to schedule the videos to be available in a fixed sequence or at fixed time periods, or some combination of these options. Content providers may also define promotional channels that are freely available to encourage users to subscribe.

The content hosting system then makes these channels available to users in an online web-based marketplace. Users can search or browse the marketplace for channels of interest, and selectively subscribe to channels through the marketplace. Users pay for a subscription channel on a regular interval (e.g., monthly) for the right to view the videos contained within the channel. Users can terminate their subscriptions to channels at any time, at which point the user no longer has access to the channel.

The marketplace makes available hundreds, even thousands or tens of thousands of channels from any number of content providers. To encourage users to explore the channel offerings of the content providers and to assist them in finding content of interest in given the vast size of the marketplace, the content hosting system provides a value ranking function that ranks the channels that are available to users in the marketplace based on the value of the channels as indicated by the behavior of the subscriber community. The system ranks channels based on a number of criteria, including content, price, user churn, video churn, user ratings, and usage information, and similar factors indicative of subscriber interest and usage of the channels. Users browsing or searching for channels to subscribe to can select to view available channels in the order of their value ranking, and as corresponding to any search terms they enter. Generally, users will seek out and subscribe to the highest ranked channels that provide the greatest value at the lowest cost. The value ranking function also gives providers a mechanism to identify, evaluate, and create better performing channels, and therefore generate more subscriptions for their own channels. In essence, the channel value ranking function allows different content providers to compete with each other for the subscriptions of the users.

In other aspects, the content hosting system provides content providers and users with tools by which they can create channels. In one embodiment, the content hosting system can dynamically create a bundled channel to contain videos from multiple content providers, by selecting videos according their type, viewing history, ratings, and similar factors. In one embodiment, the system can dynamically determine a price for the channel based upon these factors. In such an instance, the subscription revenue generated by such a channel can be distributed to the various content providers of the videos in the channel based on factors such as viewer interest, ratings, length, or the like.

The present invention also provides number of different ways to define the selection and availability of videos in a channel. A content provider can determine how many videos will be in the channel, how long each video will be available in the channel, the price of the channel, and the regional availability of the channel. For example, a content provider can include a selected number of episodes of an ongoing television show, each month adding new episodes and removing old ones, so that subscribers maintain their subscriptions over time. A content provider can create promotional channels to draw new subscribers in, tailor channels to specific genres of video content (e.g., sports, music, comedy) or interest groups. Content providers can observe their channel's reception in the market by analyzing rankings and usage statistics to adjust channels to maximize market share, subscriber base, or market-wide user reputation.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIG. 5 illustrates one screenshot of a subscriber interface created by the channel search module to allow users to find and watch channels on the content hosting system.

FIG. 6 illustrates a screenshot of one view of a subscriber account interface FIG. 7 illustrates a screen layout of part of a subscriber account, specifically the subscriber's premium subscriptions transaction history, in one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Content Hosting System and System Overview

Figure 1:
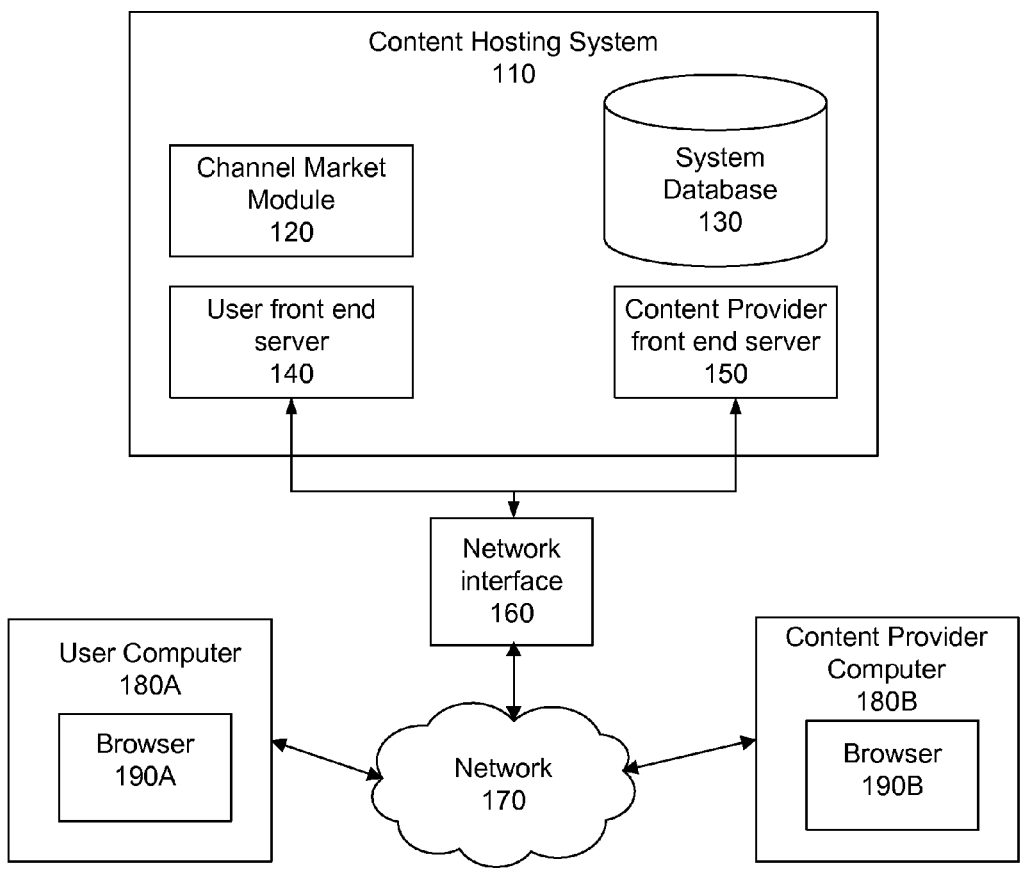
FIG. 1 is a high-level diagram illustrating a networked environment that includes a subscription video content hosting system.

FIG. 1 is a high-level diagram illustrating a networked environment 100 that includes a subscription video content hosting system 110. The content hosting system 110 makes available subscription video channels that can be viewed on user and content provider computers 180 using a browser 190. The content hosting system 110 and computers 180 are connected by a network 170 such as a local area network or the Internet.

The network 170 is typically the Internet, but can be any network, including but not limited to any combination of a LAN, a MAN, a WAN, a mobile, a wired or wireless network, a private network, or a virtual private network. The content hosting system 110 is connected to the network 170 through a network interface 160.

Only a single user computer 180A is shown, but in practice there are many (e.g., millions) users 180A that can communicate with and use the content hosting system 110. Similarly, only a single content provider computer 180B is shown, but in practice there are many (e.g., millions) content providers 190A that can communicate create channels for the content hosting system 110. The browser 190 can include a content player (e.g., Flash™ from Adobe Systems, Inc.), or any other player adapted for the content file formats used by the content hosting system 110.

User computers 180A with browsers 190A are used by users to subscribe to and watch channels provided by the content hosting system 110. Content provider computers 180B are used by content providers to create and manage subscription channels hosted on the content hosting system 110. A given computer can be both a client computer 180A and content provider computer 180B, depending on its usage. The hosting service 110 may differentiate between content providers and users in this instance based on which front end server is used to connect to the content hosting system 110, user logon information, or other factors.

The content hosting system 110 comprises a user front end server 140 and a content provider front end server 150 each of which can be implemented as one or more server class computers. The content provider front end server 150 is connected through the network 170 to content provider computers 180B. The content provider front end server 150 provides an interface for content providers to create and manage subscription channels. The user front end server 140 is connected through the network 170 to client computers 180A. The user front end server 140 provides an interface for users to subscribe to and watch channels created by content providers.

The content hosting system 110 is implemented by a network of server class computers that can include one or more high-performance CPUs and 1 G or more of main memory, as well as 500 Gb to 2 Tb of storage. An operating system such as LINUX is typically used. The operations of the content hosting system 110, front end 140 and back end 150 servers as described herein can be controlled through either hardware (e.g., dedicated computing devices or daughter-boards in general purpose computers), or through computer programs installed in computer storage on the servers of the service 110 and executed by the processors of such servers to perform the functions described herein. One of skill in the art of system engineering and video content hosting will readily determine from the functional and algorithmic descriptions herein the construction and operation of such computer programs.

The content hosting system 110 further comprises a system database 130 that is communicatively coupled to the network 170. The system database 130 stores data related to the content hosting system 110, including the channels and videos that make up the channels, along with user subscription and system usage information.

The system database 130 can be implemented as any device or combination of devices capable of persistently storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the teachings here.

The content hosting system 110 is further comprised of a channel market module 120. The channel market module 120 is implemented as part of the content hosting system 110 in conjunction with the components listed above. The channel market module 120 provides a mechanism by which users seeking channels to which to subscribe can obtain content from content providers who have created channels. The channel market module 120 receives new subscription channels created by content providers at the content provider front end server 150. The channel market module 120 stores subscription channels in the system database 130. The channel market module 120 provides the subscription channels to users through the user front end server 140.

Additionally, the channel market module 120 ranks the available subscription channels contained in the system database 130 in order to encourage content providers to create channels of value for subscribers and enable users to identify channels that provide content that is deemed of valuable by the subscriber community based on the behaviors of subscribers. Channels are value ranked based several factors including, for example, channel content, subscriber feedback, and monitored subscriber viewing habits. The channel market module 120 also receives search queries from users, and returns ranked lists of matching subscription channels, where the ranking is based on the search-independent channel values as well as how well the channel matches the search query. The channel market module 120 may also be used to generate new bundled subscription channels comprising videos and channels from several different providers. The channel market module 120 can determine a distribution of subscription revenue from these channels based on several factors including, for example, what proportion of time users spend viewing content from each provider who has contributed to the bundled channel.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors included as part of the content hosting system 110. Alternatively, hardware or software modules may be stored elsewhere within the content hosting system 110. The content hosting system 110 includes hardware elements necessary for the operations described here, including one or more processors, high speed memory, hard disk storage and backup, network interfaces and protocols, input devices for data entry, and output devices for display, printing, or other presentations of data.

Numerous variations from the system architecture of the illustrated content hosting system 110 are possible. The components of the system 110 and their respective functionalities can be combined or redistributed. For example, the system database 130, channel market module 120, user front end server 140, and content provider front end server 150 can be distributed among any number of storage devices. Furthermore, the functionalities ascribed herein to any of the channel market module 120 can be implemented using a single computing device or using any number of distributed computing devices communicatively coupled via a network. For example, the channel market module 120 and system database 130 could be readily combined into a single module. The following sections describe the channel market module 120, the system database 130, and their operation in the context of the content hosting system 110.

Channel Market Module

Figure 2:
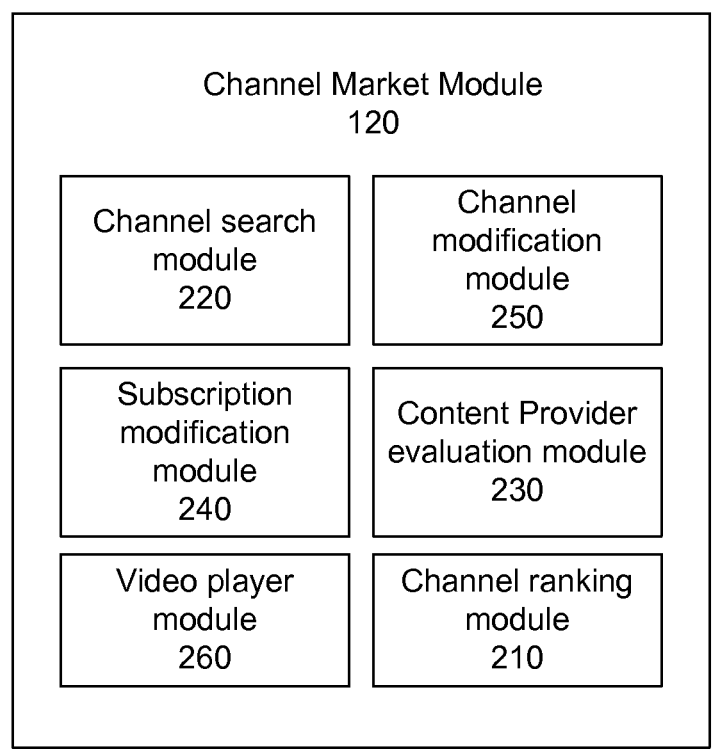
FIG. 2 illustrates a logical view of a channel market module used as part of a content hosting system.

FIG. 2 illustrates a functional view of a channel market module 120 used as part of a content hosting system 110. The channel market module 120 brings together potential subscribers looking for channels with content providers looking for subscribers for their channels.

When a content provider is using the content hosting system 110, the channel market module 120 is comprised of a channel modification module 250 that is used by providers to create new channels or modify existing channels in the provider's channel lineup. A content provider evaluation module 230 allows providers to track the performance of their channels based on feedback from subscribers, system usage data, and the channel value ranking calculated by the channel ranking module 210. The content provider evaluation module 230 also gives providers information about the performance of each of their channels so that they can improve their channels in order to remain competitive for user subscriptions.

When a potential subscriber is using the content hosting system 110, the channel market module 120 is comprised of a subscription modification module 240 that is used by potential subscribers to subscribe to new channels or to modify their existing subscription list. A channel search module 220 allows users to look for new channels to subscribe to, either through browsing or through search queries. A video player module 260 allows users to watch the channels they have subscribed to, as well as to rate the channels to provide feedback on the quality of the channel to their friends and content providers. The value ranking of channels relies in part on this user feedback, so that content providers are influenced to provide high quality channels in order to obtain high channel rankings In some embodiments, video player module 260 is embedded on a third party web site and viewed through the subscriber's browser. In other embodiments, video player module 260 is hosted on the video hosting site and viewed through the subscriber's browser.

A channel ranking module 210 monitors the content hosting system 110 in order to rank the available subscription channels on a number of different criteria. The channel ranking module 210 monitors the system by collecting and processing data related to the usage of the content hosting system 110 by subscribers. For example, the system 110 may collect usage statistics in real time by keeping various types of logs, including a subscriber usage log, a server access log, and/or a provider usage log, and then process the usage statistics asynchronously in order to determine channel rankings The channel ranking module 210 may also use sampling methods to statistically sample usages, either directly, or from the various logs. The channel ranking module 210 can determine usage statistics such as total time spent by the subscriber per subscribed channel per subscription period, or average time spent per channel per period, for example.

Channel value rankings provide users and content providers information about which subscription channels provide the best value to subscribers. Channel value rankings provided by the channel ranking module 210 affect the prominence of channels displayed by the channel search module 220 user searching or browsing. Channels that provide a high value a user will appear higher in search results when users search for channels, despite a lower match to a user's query. A high ranking will also increase the prominence of a channel when a user browses for channels without performing a specific search (e.g., during browsing).

The increased exposure of highly ranked channels incentivizes content providers to create high value channels in order to compete for user subscriptions. Channel rankings are included as part of the data presented by the content provider evaluation module 230, so that content providers are able to compare the ranking of their channels relative to the channels of other providers.

The modules that make up the channel market module 120 will be discussed in detail below, first with respect to the provider side of the content hosting system 110, second with respect to the subscriber side of the content hosting system 110, third with respect to the channel ranking module 210, and fourth with respect to the revenue-sharing channels created by the system host.

System Database

Figure 3:
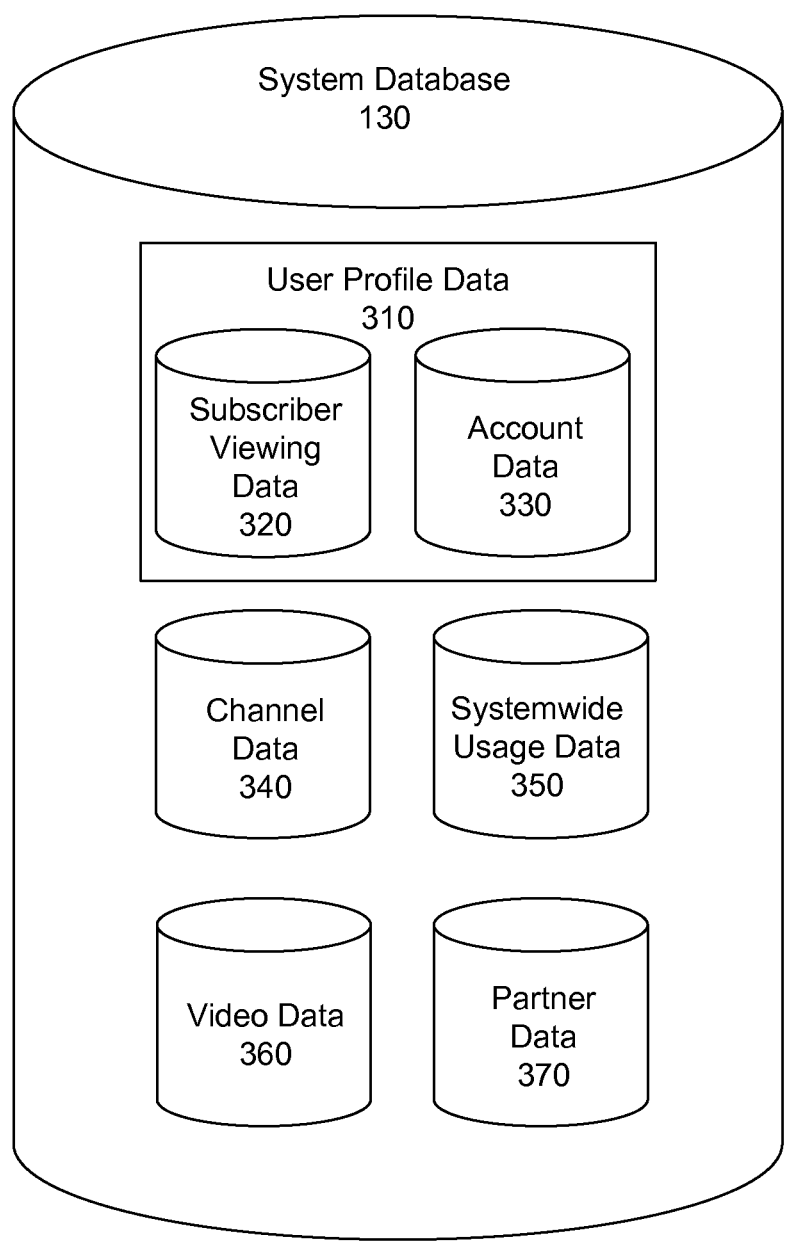
FIG. 3 illustrates a logical view of the system database that stores data related to the content hosting system.

FIG. 3 illustrates a functional view of the system database 130 that stores data related to the content hosting system 110. The system database 130 may be divided based on the different types of data stored within. This data may reside in separate physical devices, or it may be collected within a single physical device.

With respect to content providers, partner data 370 comprises information regarding content providers, or partners, registered with the content hosting service 110 that have permission to create content subscription channels. Partner data 370 includes provider contact information.

For providers creating paid subscription channels, partner data 370 contains billing and revenue sharing information for the provider. Some providers (e.g., HBO, Showtime) may create subscription channels containing pay content that simultaneously appears as part of a cable television package. These providers may have specific agreements with the operator of the content hosting service 110 for how subscription revenue will flow from the content hosting service 110 to the provider. These specific agreements will be contained in the partner data 370.

Alternatively, some providers (e.g., smaller content providers offering highly targeted content) may wish create subscription channels containing short-form and made-for-web content. These providers may not have specific agreements with the operator of the content hosting service 110 for how subscription revenue will flow from the content hosting service 110 to the provider. For these providers, partner data 370 comprises a standardized set of information to dictating how subscription revenue will flow from the content hosting service 110 to the providers. For example, for a given partner, the partner data may indicate that the content hosting service 110 receives 25% of the subscription revenue for a channel, and the content provider receives 75%. Of course other more complex allocations can be used with variable factors based on features of the content, channel, or subscriber base, and the like.

Channel data 340 describes all of each provider's created channels, along with information about the videos are contained in the channel, how the channel lineup of videos provided will rotate over time, channel promotions, and the screen layout for subscribers of the channel. Channel data 340 may includes price information for the channel as a whole. Channel data 340 also includes a flag for each video in the channel indicating whether that particular video is free for any subscriber, or restricted to premium subscribers only.

The videos themselves are stored in video data 360. Each video comprises video data that includes coded data for frames of the video, encoded using codec compatible with the client computer's video player (e.g., Flash). Video data 360 may also include metadata such as descriptive information (e.g., title, keywords, description, actors, rating, etc.) and pricing information for each video, as well as availability information (region, time period, restrictions). Providers may also indicate that a particular video is available for inclusion in bundled channels, which allows the provider to receive a portion of the subscription fee when a video is used as part of a bundled channel.

With respect to users (subscribers), the user profile data 310 contains information collected from each user. Account data 330 includes the data entered by a user when signing up for a subscriber account with the channel hosting service 110. This includes email contact information, viewing preferences for how the user interface should appear, and billing information. In some embodiments, account data 330 can be anonymized so it is associated with a user ID and not with identifying information such as user name. Account data 330 also includes all of a user's channel subscriptions as well as billing information for the user's premium subscriptions. For example, account data 330 includes whether a channel payment is automatically renewed each subscription period, or whether the subscriber must manually renew each subscription, as well as the date on which the subscription is automatically renewed or expires.

Account data 330 also includes all active choices and inputs made by a user while using the content hosting system 110. These choices include, for example, marking videos or channels as favorites, creating playlists of videos or channels, and making comments or rating viewed videos or channels. Comments include statements visible to other subscribers or non-subscribers indicating a premium subscriber's opinion on a channel's content or quality.

Subscriber viewing data 320 contains data about the user that is not explicitly entered by the user, but which is tracked as the user navigates through the content hosting system 110. Subscriber viewing data includes, for example, user viewing habits, such as the total time spent by the subscriber per subscribed channel per subscription period, average time spent per channel per period, proportion of time spent per video per channel, relative to other videos in the channel, proportion of time spent watching subscribed channels relative to non-subscription content, time of day distribution for the subscriber's viewing activities, average length of time for a viewing session for the subscriber, and click-through statistics for ads and video promotions accompanying subscription content.

System-wide usage data 350 includes data on the overall usage of the content hosting system 110. Some of this information may be aggregated or derived from the account data 330 and subscriber viewing data 320 for populations of subscribers. The population can be as the entire subscriber population, or any selected subset thereof, such as targeted subscribers based on any combination of demographic or behavioral characteristics, or channel/video selections. System-wide usage data 350 includes trends and patterns in channel viewing habits for any desired population. For example, population of subscribers to a given channel, the system-wide usage data 350 can indicate what other channels to which those subscribers tend to subscribe. In one embodiment, when a user subscribes to a new channel, system-wide usage data 350 is used to recommend other similar channels to which the user might also be interested in subscribing. System-wide data usage 350 also aggregates channel subscription churn information on a per-channel and per-provider basis, in order to calculate channel value and channel ranking and show providers their subscription churn rate.

Provider Interaction with the Channel Market Module

A content provider interface is used by a content provider to create and manage subscription channels on the content hosting system 110. The content provider interface is created by the channel market module 120, and is transmitted to the content provider through the content provider front end server 150.

The content provider interface contains an overview interface (not shown) for providers to view when they log into the content hosting system 110 through the content provider front end server 150. The overview interface contains options for creating new channels, modifying existing channels, uploading videos, viewing system usage data 350, and viewing the rankings of channels provided by the channel marketplace. The overview interface further contains brief summaries of information about a provider's channels including, for example, channel rankings, and subscription revenue. Providers may customize which summaries are displayed.

A video upload interface (not shown) allows a provider to upload videos for use in a subscription channel. The video upload interface allows the user to configure options regarding the details of the uploaded video including an indication of whether the video is free or premium, the price of the video, and whether if the video can be used in a revenue sharing channel. The video upload interface allows the configuration and upload of multiple videos at the same time. The upload interface can upload videos individually, or in bulk.

Figure 9:
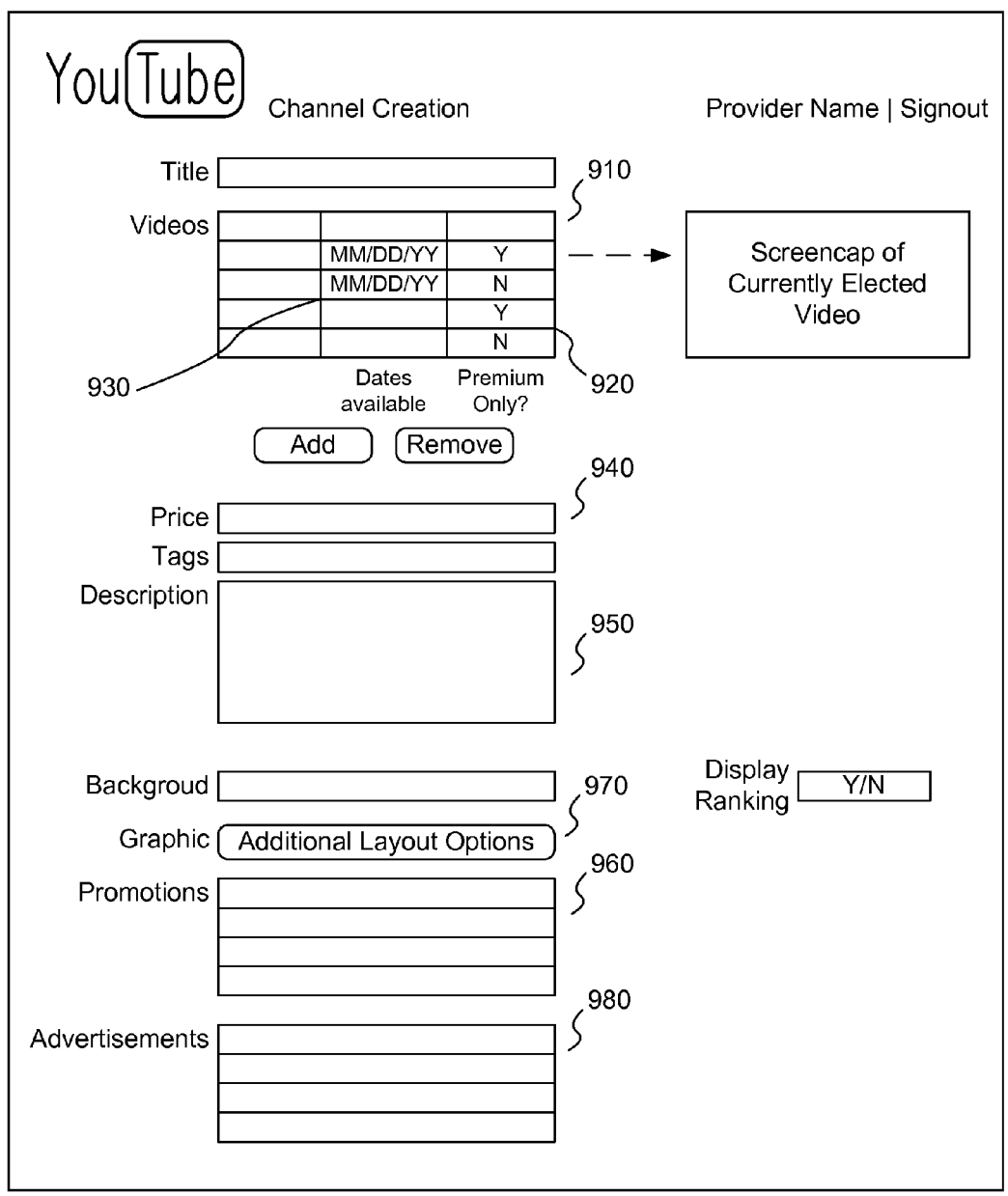
FIG. 9 illustrates a screen layout for channel creation.

FIG. 9 illustrates a screen layout for channel creation. Channel creation and modification is handled by the channel modification module 250. The channel modification module 250 generates a user interface 900 with options for providers to choose between when creating new subscription channels. The provider may add 910 to a new channel any videos which they have uploaded to the content hosting service 110. In some embodiments, the provider may add videos that have been uploaded by another.

For each video made a part of a channel, the provider must specify 920 which videos are premium videos that are available only to subscribers who pay a subscription fee for access. Users may subscribe to a channel to view the free videos without paying a subscription fee. They may then choose to upgrade their subscription to a premium subscription to be able to watch the premium content.

The provider must also specify 930 the dates during which each video will be available on the channel for viewing. This way, providers can rotate videos in or out of a channel's watchable video list, to encourage subscribers to renew their subscriptions. Rotating channels in or out also prevents subscribers from watching all of the videos on the channel within one subscription period and then unsubscribing from the channel once they have exhausted the channel's content. In one embodiment, in order to create a premium subscription channel, the provider must specify at least five premium videos as viewable by premium subscribers at any given time.

Providers may also allow videos in a channel to be viewable indefinitely. This may be the case, for example, where the video is part of the free portion of a subscription channel rather than premium portion, and leaving the video up indefinitely is beneficial. For example, in the case where a channel comprises episodes of a serialized television show, a preview video may be available continually which summarizes the show for new subscribers seeking to subscribe to the show's channel mid season. The provider may choose to make available only the most recent episodes, with the exception of a summary or promotional video which is available at all times.

The provider also specifies 940 a monthly subscription price for the channel if they wish the channel to support premium subscriptions. In one embodiment, providers are offered a choice of price tiers for setting the price of their premium channels. For example, the price tiers may range from $0.99 to $49.99 per month. In another embodiment, providers may specify their own subscription prices.

The subscription revenue generated from premium subscriptions is split between the provider and the operator of the content hosting system 110. The range of the share of revenue received by the providers varies between 30% and 70% of the subscription revenue, with the system operator receiving the remainder. In other embodiments, the revenue share for the provider and system operator may vary depending upon an agreement for fee sharing between the provider and the system operator.

Additional channel information entered 950 by providers may include a channel title description that will be available to users. Providers may also specify keywords that will not be visible to users but that will be used to match the channel to user search queries. Providers are incentivized to use keywords that accurately represent the content of the channel. For example, keywords that do not accurately represent the content of the channel will likely cause subscribers to unsubscribe from the channel, rate the channel poorly, negatively comment on the channel, and otherwise negatively influence the ranking of the channel. The result in this case will be that because of a poor ranking, the channel will no longer appear on search results when a potential subscriber searches for a channel with the specified terms, and thus, an overall reduced subscriber base for the channel than would have otherwise occurred with the use of accurate keywords.

Providers may also attach 960 promotions or prizes to the channel. For example, providers may distribute tickets to live events for premium subscribers. In one embodiment, a chosen number of promotional prizes are distributed by randomly selecting users from the base of paid subscribers to a provider's channel and emailing these users to visit the channel's page, where they are asked to provide additional information (e.g., mailing address) to receive their promotional prize. In another embodiment, the first users to complete a specified call-to-action receive a promotional prize. Examples of call-to-action types include signing up as a paid subscriber (if the user is not one already), and writing a comment or review on the Provider's channel page.

Providers may also choose to customize 970 the channel layout that subscribers see when deciding whether to subscribe to a channel, and once they have subscribed which videos of a channel to watch. A provider may wish to display, for example, the current videos available for viewing on the channel, a detailed summary of the channel, provider promotions for this and other channels created by the same provider, channel advertisements, channel price, and favorable comments made by subscribers. In one embodiment, some aspects of the display are not customizable such as display of the channel ranking Providers may also allow free subscribers who have not yet upgraded to premium subscriptions to view previews of premium content in order to convince them to upgrade. In one embodiment, the preview consists of the first ten seconds of each premium video currently available on the channel.

Providers may also choose to add 980 advertisements to their channels. Advertisements allow providers to create paid subscription channels with a lower subscription fee than might otherwise be possible. Advertisement is also another axis on which providers can tune subscription channels to try and improve their channel's rankings Some users may prefer a higher subscription fee in order to avoid advertisements, while others may prefer viewing advertisements in order to keep the fee of the subscription low. In one embodiment, providers may create a subscription channel with two premium prices, one displaying premium videos with advertisements and the other omitting the advertisements.

If a channel contains advertisements, the video player module 260 displays the advertisements in the same window as the video being watched. The advertisement may be a video that replaces the viewed video for the duration of the advertisement. Alternatively, the advertisements may be in other formats such as pure text advertisements, providing a hyperlink to an advertiser's website, text-and-audio advertising, and still image advertising. In one embodiment, the advertisement content is stored in an advertisement database that is separate from the system database 130, and is managed by an advertising control system that is separate from the content hosting system 110. In this embodiment, the advertising control system both manages access to the advertising content stored in the advertisement database, and also serves to associate advertising content with the videos and channels of the content hosting system 110.

Once the channel description is completed, the channel becomes available for subscription by users through the channel market module 120.

The channel modification module 250 allows a provider to modify one of their existing channels. The channel modification module 250 uses the interface described above for the creation of new channels for the modification of existing channels. Frequently, modification will involve adding or deleting videos from the channel, modifying the description or title, or modifying the price of the channel.

When the price of an existing premium channel is changed by a provider, there are a number of different ways in which that change can be applied. In one embodiment, the price is not immediately applied to all subscribers. Instead, the new price will not affect current subscribers until the end of their current subscription period, whereas new subscribers after the price change pay the new price. Once the price has been changed, all subscribers are notified of the price change. If the price of the channel decreases, subscribers are not required to do anything in response to the price change. If, however, the price increases, subscribers set to automatically renew their subscriptions have to re-enable automatic renewal in order to maintain their subscription. When a user's subscription period to such a channel ends, the user may choose to cancel rather than renew their subscription.

Notification to users upon price change is automatic not only for the financial benefit of subscribers, but also to increase the ability of subscribers to exert market pressure on providers to create channels of high value at low cost. Being forced to accept a new higher price for a channel is one way subscribers can "vote with their remotes" and thereby affect the channel rankings. Generally, cancellations reflect that subscribers have decided that a channel is not providing a good value relative to its cost. As a result, cancellations will generally result in a decrease in a channel's ranking This information is useful to the provider determining channel pricing.

The content provider evaluation module 230 allows a provider to obtain data about their channel offerings as a whole. General statistics include, for example, total subscription revenue, total unique subscribers, and total subscriber churn. Generally, low subscriber churn is desirable because it means subscribers are maintaining their subscriptions to the provider's channels because they believe the channels provide value. Aggregate information may be useful for providers for promotional purposes, for example to target potential subscribers with future channel offerings, or for convincing advertisers to advertise on their channels.

The content provider evaluation module 230 also allows a provider to drill down into usage data regarding individual channels. Individual channel data includes, for example, channel rank, channel churn, total subscribers over the life of the channel, current number of subscribers, subscribers as function of time, proportion of views or time viewing videos available or previously available on the channel, user comments regarding the channel, price information, and related channels which premium subscribers of this channel also subscribe to.

In one embodiment, providers are also able to obtain channel specific information about channels provided by other partners. In one embodiment, providers are able to view all channel specific information that would be available to the channel owner. In another embodiment, the provider is only able to view a subset of the information that is available to the channel owner.

The content provider evaluation module 230 also allows providers to track the rankings of their channels relative to the other channels in the marketplace. The subscription channels of the content hosting system are ranked by the channel ranking module 210. The ranking is important to providers because the ranking affects how prominently a channel will appear when a user searches or browses for channels to subscribe to. The content provider evaluation module 230 also allows providers to track the performance of their channels relative to other channels based on other metrics, such as subscription revenue. Some embodiments also allow providers to drill down to view channel usage data for channels created by other providers.

Subscriber Interaction with the Channel Market Module

FIG. 5 illustrates one screenshot of a subscriber interface created by the channel search module 220 to allow users to find and watch channels on the content hosting system 110.

The subscriber interface is created by the channel search module 220, and is transmitted to the user through the user front end server 140.

The subscriber interface 500 is viewed by a user when using the content hosting system 110 through the browser 190A of their computer 180A. The subscriber interface allows a user to browse categories 510 of channels to find channels 520 to subscribe to. Tabs 530 or listings may be used to differentiate between categories, for example using separate tabs for videos, movies, or television shows. The subscriber interface may also differentiate according to content type, for example using separate listings 540 for comedies, sports, or news content. When a user is browsing for channels, the channels that are shown are selected based on their ranking in addition to the user's selection criteria. Higher ranked channels will receive more exposure on the subscriber interface.

The channel search module 220 also has a search function allowing a user to enter a search query 550 to find channels of interest. The search query is parsed and is matched against the channel description and channel keywords to determine a list of search results comprising the matching channels. The channel description and channel keywords may also be referred to as textual metadata. The matching channels may also be determined using derived metadata based on techniques such as machine video classification and automatic speech-to-text transcription.

Figure 10:
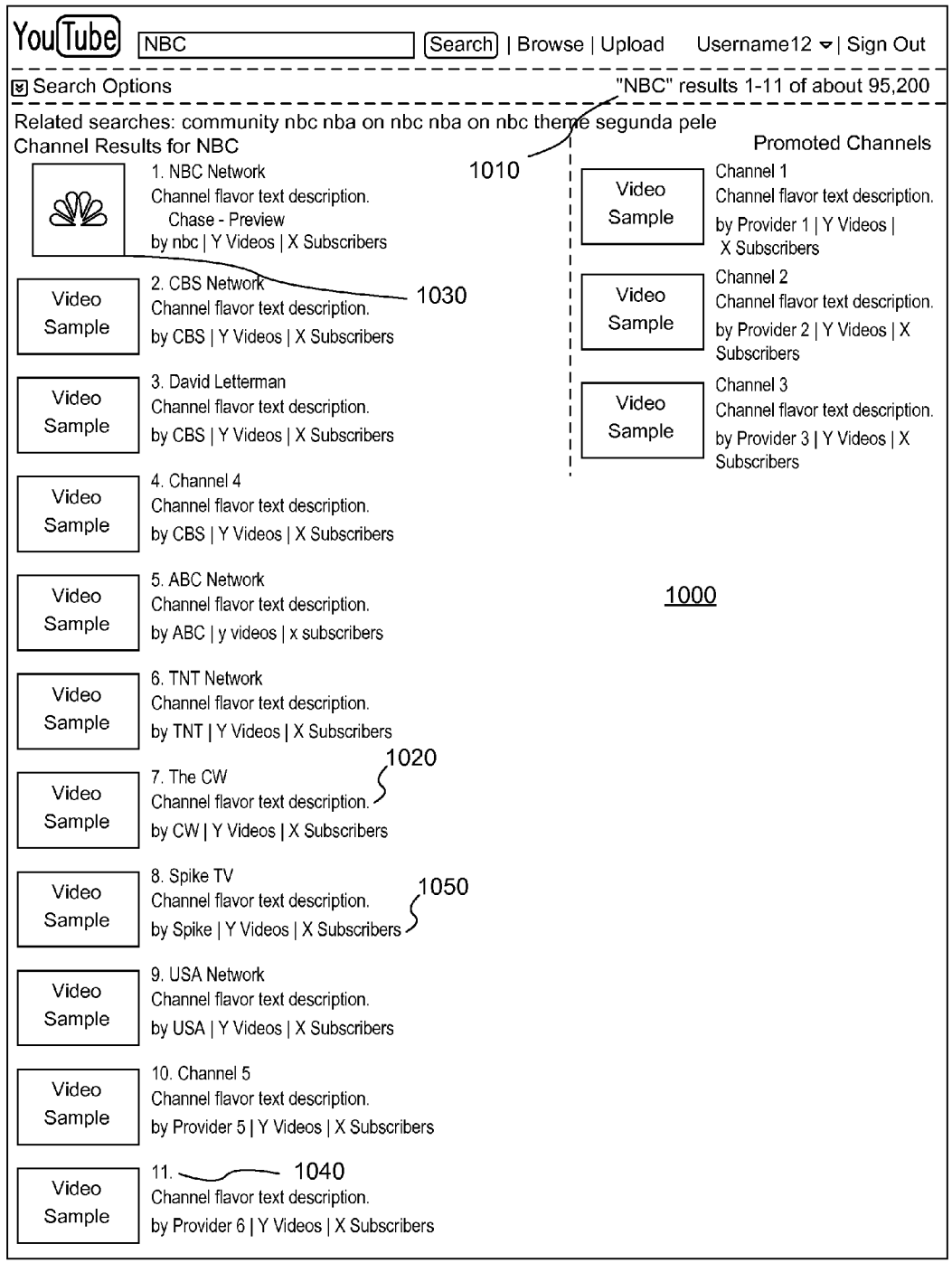
FIG. 10 illustrates a screen layout of search results displayed in ranked order.

FIG. 10 illustrates a screen layout of search results displayed in ranked order. In determining the list 1000 of matching channels, the search function may also take into account a user's stored viewing preferences from the user profile data 310, as well as system-wide usage data 350. The search result list 1010 is ordered according to the weighted combination of the quality of the match between the channels in the list and the user search query, the user and system data, and channel ranking A highly ranked channel may appear higher in the list of matching channels relative to a low ranked channel that more accurately matches the search information, depending on the value of each channel.

The resulting list of matching ranked channels is displayed 1000 to the user through the subscriber interface. In addition to the list of matching ranked channels, the subscriber interface may also display a short summary 1020 of the channels in the list, screen captures 1030 or title images of the channels, channel price, channel ranking 1040, the description tags of the channel, or other relevant details of the channel (e.g., number of subscribers, number of videos, provider name 1050). The user may also filter the list to show all channels, only free channels, or only premium channels.

Figure 4:
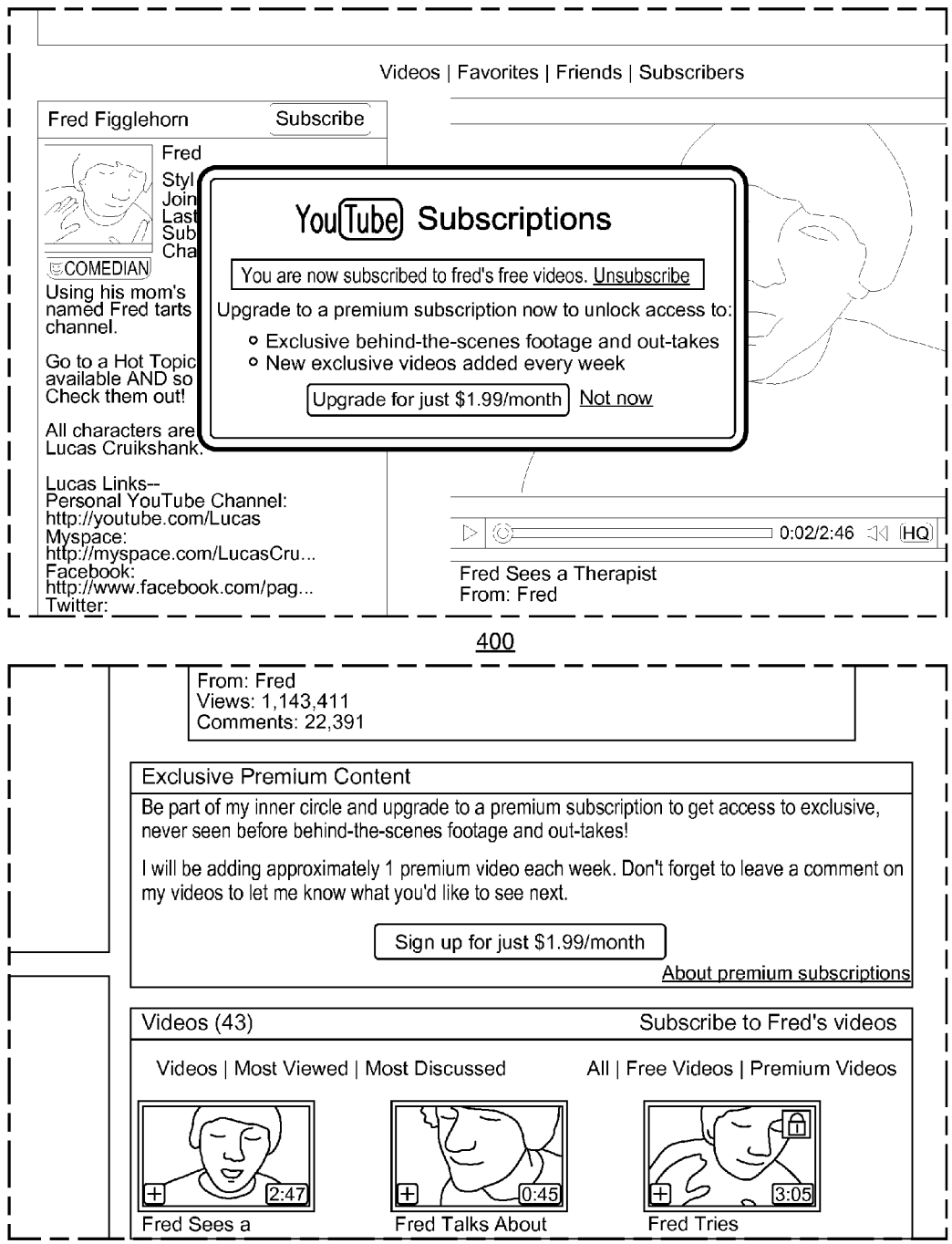
FIG. 4 illustrates one screen layout of a subscriber interface displaying detailed information about an individual channel to a prospective subscriber.

FIG. 4 illustrates one screen layout of a subscriber interface displaying detailed information about an individual channel to a prospective subscriber. When a user selects a particular channel they are interested in, the subscriber interface 400 displays all the detailed information about the channel, which may have been customized by the provider as described above. The user is also provided the opportunity to subscribe to the channel.

When a user decides to subscribe to a channel, if necessary (e.g., the user does not already have an account in the system) the subscription modification module 240 first collects user information to create a user profile 310 including account data 330, as described above.

Once a user's subscriber account has been created, the subscription modification module 240 enables the user to complete the subscription transaction. An interface displays channel information such as the channel to be subscribed to, the price of a monthly subscription to the channel, information about the channel provider, and the subscription period. The subscriber is also given the option to choose between automatically having the subscription renewed every month, or manually renewing the subscription of the channel. Once payment is confirmed, the subscriber's account is updated to reflect the new subscription.

Generally, a user may cancel a subscription at any time. If the user cancels in between pay periods, they pay a pro rata amount of the monthly subscription fee. The pro rata amount may be calculated based on when within the pay period the user cancels, or it may based on the amount of channel content the user consumes before canceling. In one embodiment, there is minimum subscription period of 30 days, in order to prevent users from subscribing for only a few days in order to watch all of the content of a channel.

Figure 6:
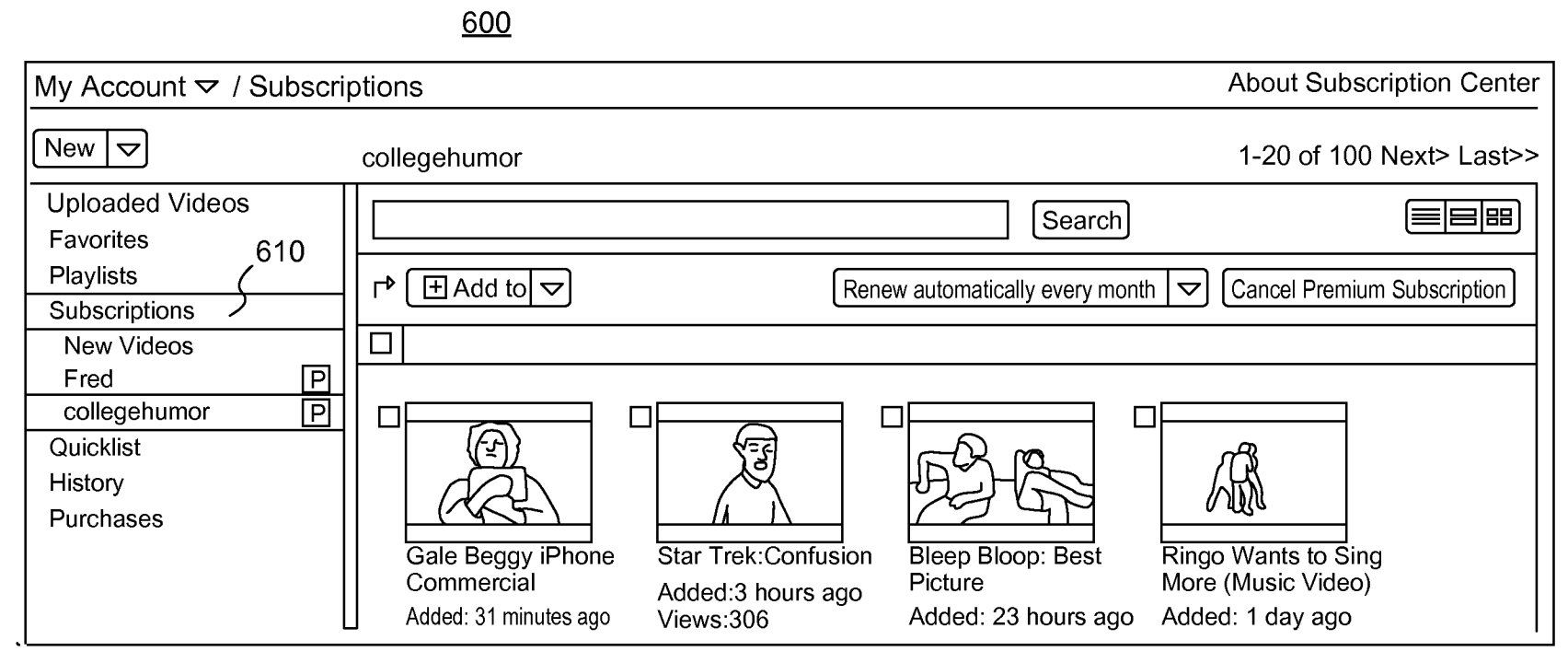

FIG. 6 illustrates a screenshot of one view of a subscriber account interface. The subscriber account 600 may contain a listing 610 of the user's free and premium channel subscriptions, information about videos that have been uploaded by the user, videos or channels the user has marked as favorites, playlists created by the user, quicklists, the user's channel and video viewing history, the user's subscription history, and purchases made by the user.

FIG. 7 illustrates one example of a screen layout of part of a subscriber account, specifically the subscriber's premium subscriptions transaction history 700. The history lists the premium channels 710 that the user either is currently subscribed to or has been subscribed to in the past. The user may filter between viewing all subscriptions 711, all active subscriptions 712, and all inactive subscriptions 713. The history shows the current price 720 of each subscription channel, start and end dates for each channel's subscription period 730, and the renewal type 740 for each active channel. The history also displays text or controls (e.g, buttons) 750 guiding the user on actions that can be taken with respect to each channel. For example, if the user has any expired subscriptions, the history guides the user on how the subscription may be renewed.

The channel market module 120 further comprises a video player module 260 that allows subscribers to watch the videos contained within subscription channels. If the user is a premium subscriber, they can view all videos in the channel. If the user is a free subscriber, they can view only the free videos in the channel. Furthermore, the video player module 260 allows a provider to embed their channels and videos into their own third party sites. These third party sites may also access subscriber information from system database 130. Using this information, third party sites may allow visitors who are also subscribers to the provider's channels to view free and premium content on the provider's third party site.

While the user is watching a video, they may also engage in several other activities simultaneously. The user may rate the video they are currently watching, or rate the channel as a whole. Users watching a channel may also comment on the video or the channel and interact with other subscribers of the channel. Finally, users may request help from representatives of the content hosting system 110 if they encounter problems watching a channel, or suspect fraud on the part of the provider.

Channel Rankings

The channels of the content hosting system 110 are ranked by the channel ranking module 210. This ranking represents a determination of channel value provided to a subscriber. The ranking affects the positioning of channels when a user is browsing or searching for channels to which to subscribe. As users are most likely to subscribe to channels the appear in the first several pages of the search results or channel listing, providers are incentivized to create channels of greater value so that their channels are ranked higher in the channel list, because greater prominence will likely result in a greater number of subscriptions and therefore more subscription revenue. Having a large number of channels of high value is also beneficial for the content hosting system 110 as a whole as it provides a basis for interesting subscribers who might not have created subscriber accounts otherwise. More subscribers in turn incents more content providers to provide more channels, further increasing the competitiveness of the market in a virtuous spiral.

The channel ranking is based upon the monitored usage of the channel by its subscribers. Subscriber usage of a channel can be broken down in three primary groups of monitored data: channel content, user feedback, and monitored subscriber viewing data. In one embodiment, the ranking is a weighed combination based upon these three groups of data. Channel content data comprises information about the content as determined by the provider including, for example, channel price, the videos available for viewing as part of the channel, channel advertisements, and channel promotions. User feedback data comprises information actively entered by channels subscribers including, for example, user channel ratings, user comments, user help requests, and user fraud reports. Finally, monitored subscriber viewing data comprises all data not actively entered by subscribers, but derived from the subscriber's access to the content hosting system and viewing of channels and videos therein. From this subscriber viewing data, the system can determine the proportion of time a user spends watching a given video or channel relative to the other available videos or channel, and other metrics, as described above.

The ranking may also be determined as a weighted combination of the quality or value of a subscription offering combined with the relevance of the subscription offering to the subscriber's interest profile. The quality of a subscription offering combines channel content data (e.g., content churn, subscriber churn) with user feedback data (e.g., user ratings). The relevance of the subscription offering to the subscriber's interests profile combines user feedback data (e.g., user ratings) with monitored subscriber viewing data (e.g., what channels this and other users tend to view).

Providers can use feedback from the channel ranking determined by the content provider evaluation module 230 to determine what changes need to be made to increase a channel's ranking For example, lower subscriber churn will usually result in a higher channel ranking A provider whose channels have high subscriber churn can view this data through the content provider evaluation module 230. The provider can then make changes that will hopefully decrease subscriber churn in future, and as a result increase their channel's ranking and revenue.

Bundled Channel Generation

The content hosting system 110 is configured to allow the system operator to generate bundled subscription channels comprising videos and channels from several different providers. Bundled channels may bundle together videos that providers have affirmatively allowed to be included in bundled channels. Alternatively, the bundled channel may bundle together entire channels which providers have allowed to be bundled in this manner. In one embodiment, existing channels are bundled to form a subscription package that can be promoted to users, for example, as a replacement for existing cable television subscription packages. In order to generate a bundled channel, the system operator uses the channel modification module 250. The interface for creating a bundled channel is similar to the interface used by a provider to create or modify a subscription channel.

The subscription fee from a bundled subscription channel can be distributed between the providers whose content makes up the channel and the system operator. The providers whose videos are part of the bundled channel may receive some share of subscription revenues, for example, pro rata based on the proportional number of minutes subscribers actually spend watching their content versus watching content contributed by other providers. Alternatively, the revenue may be distributed based on other factors such as viewer interest, ratings, length, or the like, or simply an a priori allocation based on exogenous factors (e.g., the provider's content, market share, or the like). The system operator also receives a non pro rata portion of the total subscription revenue for the bundled channel.

In one embodiment, as part of the bundled channel creation process, the channel modification module 250 can perform a price setting arbitrage function in order to determine the price of the bundled channel. The price setting arbitrage function is used to price and upsell the user to a personalized bundle of subscription offerings based on the user's profile data and the channels that a user is about to sign up for. Depending on the user's likely consumption pattern, the price of the bundle may be substantially lower than signing up for each subscription offering separately. The price setting arbitrage function takes into consideration the user's viewing history (e.g., the duration spent watching videos per unit time, the number of videos watched per session), and uses this information to predict the average number of videos the user is likely to watch from the combined bundle.

The bundled channel is bundled and priced such that if the user subscribes, they will spend more on the bundled subscription than they would have otherwise, and receive more video content than they watch on average. In this embodiment, the content host is paying each provider participating in the bundle a revenue share rate that is proportional to the number of their videos the user watches. If the subscriber does not watch enough videos, there will be leftover subscription revenue that the content host will not have to distribute. The content host derives a benefit from creating the bundled channel because on average the additional subscription revenue will go to the content host rather than providers because the user's viewing habits predict they will not watch all of the bundled content.

Figure 8:
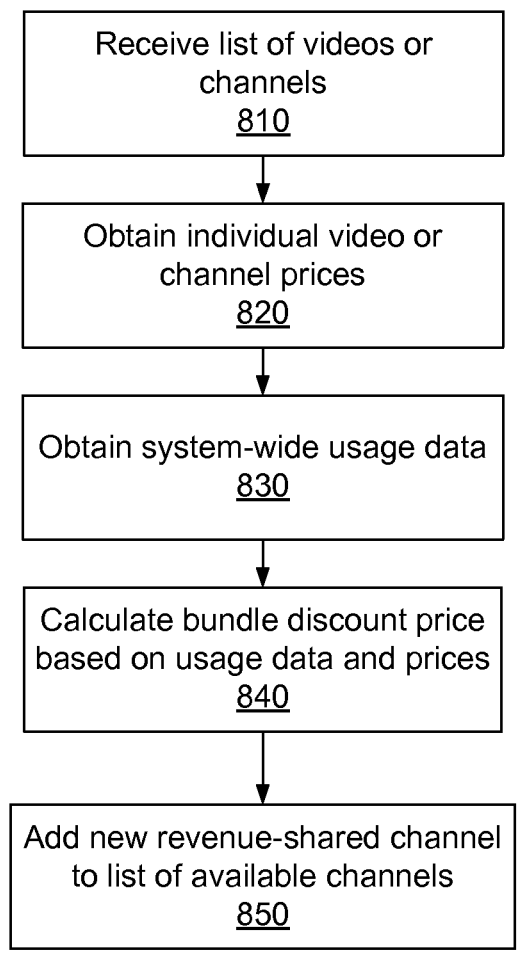
FIG. 8 illustrates a flow chart of the channel modification module performing price setting arbitrage in order to calculate the price of a bundled channel.

FIG. 8 is a flow chart of how the channel modification module 250 performs price setting arbitrage in order to calculate the price of a bundled channel. The channel modification module receives 810 a list of videos or channels to be added to the bundled channel. For each video or channel to be added to the bundled channel, the channel modification module obtains 820 the respective video price 360 or channel price 340 from the system database 130. The channel modification module also obtains 830 subscriber viewing data 320 in order to determine what proportion of time users will spend watching each video or channel within the bundled channel. The channel modification module then calculates 840 a bundle discount price for the bundled channel based on the usage data and individual video and channel prices. Finally, the channel modification module adds 850 the newly created bundled channel to the list of available channels on the content hosting system 110.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing subscription video channels on a content hosting system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for promoting subscription video channels provided on a content hosting computer system to subscribers over a network, the method comprising:

providing at the content hosting computer system a plurality of subscription channels, each subscription channel including a plurality of videos controlled by a provider, and having a subscription price and a plurality of subscribers;

providing the subscribers access over the network to the videos at the content hosting computer system in a subscription channel responsive to receiving over the network a payment of the subscription price for the subscription channel from the subscriber;

monitoring, over a period of time, a subscriber churn rate of each subscription channel, the subscriber churn rate based on amounts of time subscribers are maintaining their subscriptions to the subscription channel;

determining, by the content hosting computer system, a channel value for each subscription channel based upon a combination of the subscription price and the subscriber churn rate of the subscription channel;

ranking, by the content hosting computer system, the subscription channels based upon their respective channel values; and presenting by the content hosting computer system and over the network the ranked subscription channels to a subscriber.

2. The method of claim 1 further comprising monitoring, over the period of time, at least one from the group of monitored user viewing habits, subscriber feedback, and channel content.

3. The method of claim 2 wherein monitored user viewing habits comprise an amount of time each subscriber spends watching each video for each of the subscription channels.

4. The method of claim 2 wherein subscriber feedback comprises user ratings, user comments, user help requests, and user fraud reports.

5. The method of claim 2 wherein channel content comprises channel price, the videos in the channel, channel advertisements, and channel promotions.

6. The method of claim 1 further comprising:
receiving a set of modifications for one of the subscription channels responsive to the ranking.

7. The method of claim 6 wherein the set of modifications to the subscription channel comprises at least one from the group of changing the videos, adding new promotions, adding or removing channel advertisements, changing a channel price, changing a channel description, changing a channel title.

8. The method of claim 1 wherein the videos available as part of the channel change over the period of time.

9. The method of claim 1 wherein the videos in a subscription channel comprise episodes of a serialized television show.

10. A computer implemented method for ranking subscription video channels provided on a content hosting computer system to subscribers over a network, the method comprising:

providing at the content hosting computer system a plurality of subscription channels, each subscription channel including a plurality of videos controlled by a provider and having a subscription price and a plurality of subscribers;

providing the subscribers access over the network to the videos at the content hosting computer system in a subscription channel responsive to receiving over the network a payment of the subscription price for the subscription channel from the subscriber;

monitoring, over a period of time, a subscriber churn rate of each subscription channel, the subscriber churn rate based on amounts of time subscribers are maintaining their subscriptions to the subscription channel;

determining, by the content hosting computer system, a channel value for each subscription channel based upon a combination of the subscription price and the subscriber churn rate of the subscription channel;

receiving at the content hosting computer system a search query;

ranking, by the content hosting computer system, the subscription channels based upon their respective channel values and the search query; and presenting by the content hosting computer system and over the network the ranked subscription channels to a subscriber.

11. The method of claim 10 further comprising monitoring, over the period of time, at least one from the group of monitored user viewing habits, subscriber feedback, and channel content.

12. The method of claim 11 wherein monitored user viewing habits comprise an amount of time each subscriber spends watching each video for each of the subscription channels.

13. The method of claim 11 wherein subscriber feedback comprises user ratings, user comments, user help requests, and user fraud reports.

14. The method of claim 11 wherein channel content comprises the subscription price, the videos in the subscription channel, channel advertisements, and channel promotions.

15. The method of claim 10 further comprising:
receiving a subscription request and a payment of the subscription price from a user for a subscription channel in the ranked subscription channels; and
listing the user as one of the subscribers of the subscription channel.

16. A computer implemented method for generating a bundled channel provided on a content hosting computer system to subscribers over a network, the method comprising:

providing, at the content hosting computer system, a plurality of subscription channels, each subscription channel including a plurality of videos controlled by a provider and having a subscription price and a plurality of subscribers;

providing the subscribers access over the network to the videos at the content hosting computer system in a subscription channel responsive to receiving over the network a payment of the subscription price for the subscription channel from the subscriber;

monitoring, over a period of time, a subscriber churn rate of each subscription channel, the subscriber churn rate based on amounts of time subscribers are maintaining their subscriptions to the subscription channel;

determining, by the content hosting computer system, a channel value for each subscription channel based upon a combination of the subscription price and the subscriber churn rate of the subscription channel;

creating, by the content hosting computer system, the bundled channel comprising the plurality of bundled videos.

17. The method of claim 16 wherein determining the bundled videos to add to the bundled channel is further based on a proportional viewing time the subscribers of a subscription channel spent watching one of the videos in one of the subscription channels relative to the other videos in the subscription channel.

18. The method of claim 16 wherein determining the bundled videos to add to the bundled channel is further based on a proportional viewing time the subscribers of a subscription channel spent watching the videos of one of the subscription channel relative to the videos of other subscription channels.

19. The method of claim 16 further comprising monitoring subscriber data over the period of time, the subscriber data indicating which of the subscription channels a subset of subscribers subscribe to, and wherein determining the bundled videos to add to the bundled channel is further based on the subscriber data.

20. The method of claim 16 further comprising.
receiving a price and an estimated proportional viewing time for each video in the bundled channel relative to the other videos in the bundled channel;
determining a bundled subscription price for the bundled channel based on the prices and the proportional viewing times; and
distributing a bundled channel subscription revenue to a list of contributing providers based on an actual proportional viewing time for each video in the bundled channel relative to the other videos in the bundled channel.

* * * * *